(12) United States Patent
Meylan

(10) Patent No.: US 8,175,050 B2
(45) Date of Patent: May 8, 2012

(54) RESOURCE RELEASE AND DISCONTINUOUS RECEPTION MODE NOTIFICATION

(75) Inventor: Arnaud Meylan, Bois-Colombes (FR)

(73) Assignee: QUALCOMM Incorporated, San Diego, CA (US)

( * ) Notice: Subject to any disclaimer, the term of this patent is extended or adjusted under 35 U.S.C. 154(b) by 601 days.

(21) Appl. No.: 12/369,622

(22) Filed: Feb. 11, 2009

(65) Prior Publication Data
US 2009/0207794 A1 Aug. 20, 2009

Related U.S. Application Data

(60) Provisional application No. 61/028,422, filed on Feb. 13, 2008.

(51) Int. Cl.
*H04W 4/00* (2009.01)
(52) U.S. Cl. .................................. 370/329; 370/336
(58) Field of Classification Search .......... 370/328–329, 370/335–338, 341–345, 348, 389, 395.2, 370/395.4, 437, 441–443, 465, 468
See application file for complete search history.

(56) References Cited

U.S. PATENT DOCUMENTS

| | | | | |
|---|---|---|---|---|
| 7,684,799 | B2* | 3/2010 | Kuchibhotla et al. | 455/436 |
| 8,045,507 | B2* | 10/2011 | Kim et al. | 370/328 |
| 2002/0075823 | A1* | 6/2002 | Lee et al. | 370/328 |
| 2005/0143107 | A1* | 6/2005 | Pattar et al. | 455/466 |
| 2007/0133479 | A1* | 6/2007 | Montojo et al. | 370/335 |
| 2007/0140199 | A1* | 6/2007 | Zhao et al. | 370/338 |
| 2007/0242641 | A1* | 10/2007 | Ryu et al. | 370/335 |
| 2008/0117891 | A1* | 5/2008 | Damnjanovic et al. | 370/345 |
| 2008/0232284 | A1* | 9/2008 | Dalsgaard et al. | 370/310 |
| 2009/0010218 | A1* | 1/2009 | Tervonen et al. | 370/329 |
| 2009/0154417 | A1* | 6/2009 | Wu et al. | 370/329 |
| 2009/0196256 | A1* | 8/2009 | DiGirolamo et al. | 370/331 |
| 2009/0257421 | A1* | 10/2009 | Nakashima et al. | 370/345 |
| 2010/0290509 | A1* | 11/2010 | Dalsgaard et al. | 375/220 |
| 2010/0317345 | A1* | 12/2010 | Futaki et al. | 455/436 |

OTHER PUBLICATIONS

Huwai: "ul persistent resource release" 3GPP TSG RAN WG2 61, Feb. 11, 2008, pp. 1-2, XP002528942 the whole document.
International Search Report & Written Opinion—PCT/US2009/033941, International Search Authority—European Patent Office—Jun. 4, 2009.
LG Electronics Inc: "Uplink Scheduling for VoIP, 3GPP TSG RAN WG2 #56, R2-063273" Nov. 6, 2006, 3RD Generation Partnership Project (3GPP); Technicalspecification Group (TSG) Radio Access Network.
(RAN); W0rkinggr0up 2 (WG2), XX, XX, pp. 1-3 , XP002460797 the whole document.
"R2-080934 Details of MAC DRX Control, Ericsson, 3GPP RAN2", TSG-RAN WG2 Meeting #61, R2-080934, Sorento, Italy, Feb. 11-15, 2008.

* cited by examiner

*Primary Examiner* — Chi H. Pham
*Assistant Examiner* — Kevin Mew
(74) *Attorney, Agent, or Firm* — Nerrie M. Zohn

(57) ABSTRACT

Indications are provided related to discontinuous reception (DRX) and release of semi-persistent scheduling (SPS) resources from a base station to an access terminal. A DRX indicator that provides a command to an access terminal to transition to DRX mode and a resource release indicator that identifies one or more SPS resources (e.g., uplink, downlink, . . . ) previously assigned to the access terminal that are released can be transmitted within a common transaction. The DRX indicator and the resource release indicator can be sent via disparate channels (e.g., PDCCH and PDSCH) within a single transmission time interval (TTI). The DRX indicator and the resource release indicator can be transferred within a common control message.

29 Claims, 11 Drawing Sheets

RESOURCE RELEASE AND DISCONTINUOUS RECEPTION MODE NOTIFICATION

CROSS-REFERENCE TO RELATED APPLICATIONS

This application claims the benefit of U.S. Provisional Patent Application Ser. No. 61/028,422 entitled "METHOD AND APPARATUS FOR INDICATING RELEASE OF DOWNLINK RESOURCES AND INDICATING DISCONTINUOUS RECEPTION MODE" which was filed Feb. 13, 2008. The entirety of the aforementioned application is herein incorporated by reference.

BACKGROUND

I. Field

The following description relates generally to wireless communications, and more particularly to providing indications within a common transaction concerning release of semi-persistently scheduled resources and transition to discontinuous reception (DRX) mode in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

In wireless data communication, receivers (e.g., of access terminals, . . . ) use significant power. For example, components of a receiver, such as a radio frequency (RF) transceiver, a high performance analog to digital (A/D) converter, and signal processing elements, can consume significant amounts of power. Accordingly, power saving mechanisms can be utilized to mitigate such power usage.

Various techniques can be leveraged within wireless communication systems to enhance power savings for access terminals. For instance, discontinuous reception (DRX) can be employed, such that an access terminal can be permitted to forgo monitoring a control channel for a period of time. Thus, the access terminal can be in DRX mode (e.g., sleep, . . . ) for a period of time and active mode (e.g., awake, monitoring the control channel, . . . ) for a disparate period of time. Another technique that can be employed by an access terminal is semi-persistent scheduling (SPS), which allows transfer of data on a shared channel (e.g., uplink, downlink, . . . ) without indicating presence of that data with a control channel. By way of illustration, a base station can assign SPS resources to an access terminal, and these resources can remain allocated to the access terminal until the base station disables such assignment, thereby releasing the SPS resources allotted to the access terminal. Conventional techniques, however, fail to coordinate transitioning an access terminal to DRX mode with release of SPS resources.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating providing of indications related to discontinuous reception (DRX) and release of semi-persistent scheduling (SPS) resources from a base station to an access terminal. A DRX indicator that provides a command to an access terminal to transition to DRX mode and a resource release indicator that identifies one or more SPS resources (e.g., uplink, downlink, . . . ) previously assigned to the access terminal that are released can be transmitted within a common transaction. According to an example, the DRX indicator and the resource release indicator can be sent via disparate channels (e.g., PDCCH and PDSCH) within a single transmission time interval (TTI). Pursuant to a further example, the DRX indicator and the resource release indicator can be transferred within a common control message.

According to related aspects, a method that facilitates coordinating notifications provided to an access terminal in a wireless communication environment is described herein.

The method can include yielding a discontinuous reception (DRX) indicator that controls the access terminal to transition to DRX mode. Further, the method can include generating a resource release indicator that specifies release of one or more semi-persistent scheduling (SPS) resources previously assigned to the access terminal. Moreover, the method can comprise transmitting the DRX indicator and the resource release indicator to the access terminal within a single transaction.

Another aspect relates to a wireless communications apparatus. The wireless communications apparatus can include a memory that retains instructions related to generating a discontinuous reception (DRX) indicator that controls an access terminal to transition to DRX mode, generating a resource release indicator that specifies release of one or more semi-persistent scheduling (SPS) resources previously assigned to the access terminal, and sending the DRX indicator and the resource release indicator to the access terminal within a single transaction. Further, the wireless communications apparatus can include a processor, coupled to the memory, configured to execute the instructions retained in the memory.

Yet another aspect relates to a wireless communications apparatus that enables providing notifications to an access terminal concerning DRX control and SPS resource release in a wireless communication environment. The wireless communications apparatus can include means for controlling a mode employed by the access terminal. Moreover, the wireless communications apparatus can include means for releasing one or more semi-persistent scheduling (SPS) resources previously assigned to the access terminal. Further, the wireless communications apparatus can comprise means for sending a discontinuous reception (DRX) indicator to cause the access terminal to transition to DRX mode and a resource release indicator to notify the access terminal as to release of one or more SPS resources within a single transaction.

Still another aspect relates to a computer program product that can comprise a computer-readable medium. The computer-readable medium can include code, stored on the medium, for controlling a mode employed by the access terminal. Moreover, the computer-readable medium can include code, stored on the medium, for releasing one or more semi-persistent scheduling (SPS) resources previously assigned to the access terminal. Further, the computer-readable medium can include code, stored on the medium, for sending a discontinuous reception (DRX) indicator to cause the access terminal to transition to DRX mode and a resource release indicator to notify the access terminal as to release of one or more SPS resources within a single transaction.

In accordance with another aspect, an apparatus in a wireless communication system can include a processor, wherein the processor can be configured to yield a discontinuous reception (DRX) indicator that controls the access terminal to transition to DRX mode. Moreover, the processor can be configured to yield a resource release indicator that specifies release of one or more semi-persistent scheduling (SPS) resources previously assigned to the access terminal. Further, the processor can be configured to transfer the DRX indicator and the resource release indicator to the access terminal within a single transmission time interval (TTI).

According to other aspects, a method that facilitates employing indications obtained from a base station in a wireless communication environment is described herein. The method can include receiving a discontinuous reception (DRX) indicator and a resource release indicator from a base station within a single transaction. Moreover, the method can comprise transitioning to DRX mode in response to the received DRX indicator. Further, the method can include discontinuing utilization of one or more semi-persistent scheduling (SPS) resources identified as being released via the resource release indicator.

Yet another aspect relates to a wireless communications apparatus that can include a memory that retains instructions related to receiving a discontinuous reception (DRX) indicator and a resource release indicator from a base station within a single transaction, transitioning to DRX mode in response to the received DRX indicator, and discontinuing utilization of one or more semi-persistent scheduling (SPS) resources identified as being released via the resource release indicator. Further, the wireless communications apparatus can comprise a processor, coupled to the memory, configured to execute the instructions retained in the memory.

Another aspect relates to a wireless communications apparatus that enables employing indicators obtained from a base station in a wireless communication environment. The wireless communications apparatus can include means for obtaining a discontinuous reception (DRX) indicator and a resource release indicator from a base station within a single transaction. Further, the wireless communications apparatus can include means for switching to DRX mode in response to the obtained DRX indicator. Moreover, the wireless communications apparatus can include means for halting employment of one or more semi-persistent scheduling (SPS) resources specified by the resource release indicator as being released.

Still another aspect relates to a computer program product that can comprise a computer-readable medium. The computer-readable medium can include code, stored on the medium, for obtaining a discontinuous reception (DRX) indicator and a resource release indicator from a base station within a single transaction; code, stored on the medium, for switching to DRX mode in response to the obtained DRX indicator; and code, stored on the medium, for halting employment of one or more semi-persistent scheduling (SPS) resources specified by the resource release indicator as being released.

In accordance with another aspect, an apparatus in a wireless communication system can include a processor, wherein the processor can be configured to receive a discontinuous reception (DRX) indicator and a resource release indicator from a base station within a single transmission time interval (TTI). Further, the processor can be configured to transition to DRX mode in response to the received DRX indicator. Moreover, the processor can be configured to discontinue utilization of one or more semi-persistent scheduling (SPS) resources identified as being released via the resource release indicator.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
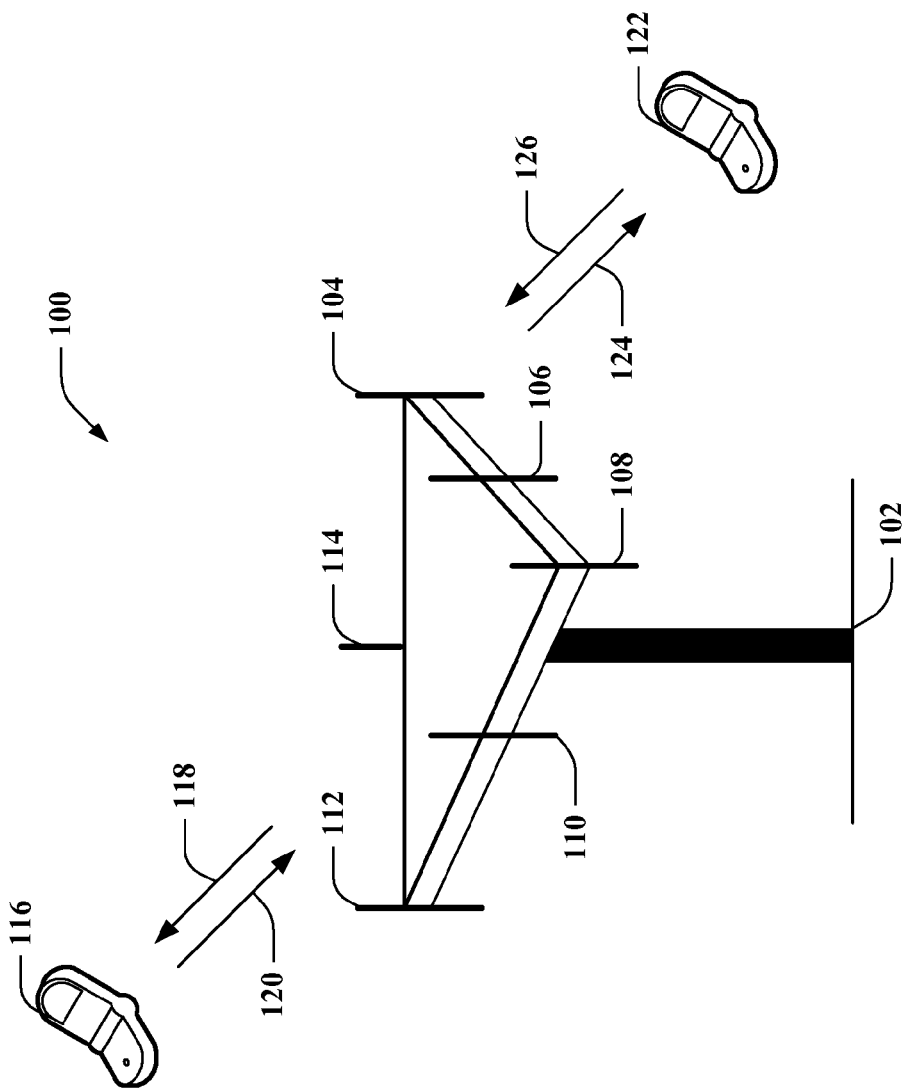
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

System 100 can coordinate employment of discontinuous reception (DRX) and semi-persistent scheduling (SPS). For example, base station 102 can release SPS resources assigned to a particular access terminal (e.g., access terminal 116, access terminal 122, . . . ) and indicate such release of SPS resources to the particular access terminal while concurrently sending the particular access terminal to DRX mode (e.g., causing a receiver to switch off, . . . ). SPS resources can be times and frequencies utilized for sending or receiving signals. Base station 102 can send indications within a single transaction (e.g., within a single transmission time interval (TTI), . . . ) to an access terminal (e.g., access terminal 116, access terminal 122, . . . ) causing the access terminal to operate in DRX mode (e.g., sleep mode, . . . ) and notifying the access terminal as to release of SPS resources previously assigned to that access terminal. Upon receiving such indications within the single transaction, the access terminal can transition to DRX mode and discontinue use of the released SPS resources.

System 100 can be a Long Term Evolution (LTE) based wireless communication system. Time periods during which each access terminal 116, 122 can receive or transmit data are typically scheduled in such LTE wireless communication environments. For example, in the case of Voice over Internet Protocol (VoIP), a given access terminal (e.g., access terminal 116, access terminal 122, . . . ) can be scheduled to receive and transmit every 20 ms; however, the claimed subject matter is not so limited. Conventionally, presence of a data channel for use by the given access terminal can be signaled over a control channel from base station 102 (e.g., control channel transmissions indicating presence of data channel resources scheduled for the given access terminal can be sent every 20 ms in the aforementioned VoIP example, . . . ). Significant overhead usage can result from such utilization of the control channel to signal presence of scheduled data channel resources for the given access terminal. Employment of semi-persistent scheduling (SPS) can be leveraged to mitigate overhead usage. More particularly, resources on an uplink data channel (e.g., Physical Uplink Shared Channel (PUSCH), . . . ) and/or a downlink data channel (e.g., Physical Downlink Shared Channel (PDSCH), . . . ) can be semi-persistently assigned to the given access terminal by base station 102. These assigned resources can continue to be allotted to the given access terminal until base station 102 disables the assignment. While SPS resources are assigned, the given access terminal can utilize such allocated resources (e.g., receive data utilizing assigned PDSCH resources, transmit data utilizing assigned PUSCH resources, . . . ) without corresponding assignments transferred from base station 102 via a control channel (e.g., Physical Downlink Control Channel (PDCCH), . . . ).

Moreover, system 100 can utilize power saving protocols or mechanisms such as discontinuous reception (DRX). DRX can reduce a duty cycle of a receiver (e.g., of an access terminal 116, 122, . . . ) during operation. For example, DRX can be utilized to turn off a radio modem (e.g., transition to DRX mode, . . . ) for periods of time and turn on the radio modem (e.g., transition to active mode, . . . ) during disparate periods of time to obtain updates from base station 102. Further, if an access terminal observes activity while in active mode, one or more timers can be started which increase an amount of time during which the access terminal remains in active mode (e.g., prior to transitioning to DRX mode, . . . ). The one or more timers can include an inactivity timer, a retransmission timer, an on-duration timer, and so forth.

According to an example, during a talk spurt, SPS resources can be assigned to an access terminal and one or more timers can maintain the access terminal in active mode. At the end of the talk spurt, SPS resources can be released since such resources are no longer needed by the access terminal. Further, the one or more timers that maintain the access terminal in active mode can be stopped, thereby allowing the access terminal to switch to DRX mode (e.g., causing the access terminal to go to sleep, . . . ). Base station 102 can indicate to the access terminal to transition to DRX mode and provide indication concerning release of at least one SPS resource within a single transaction.

Figure 2:
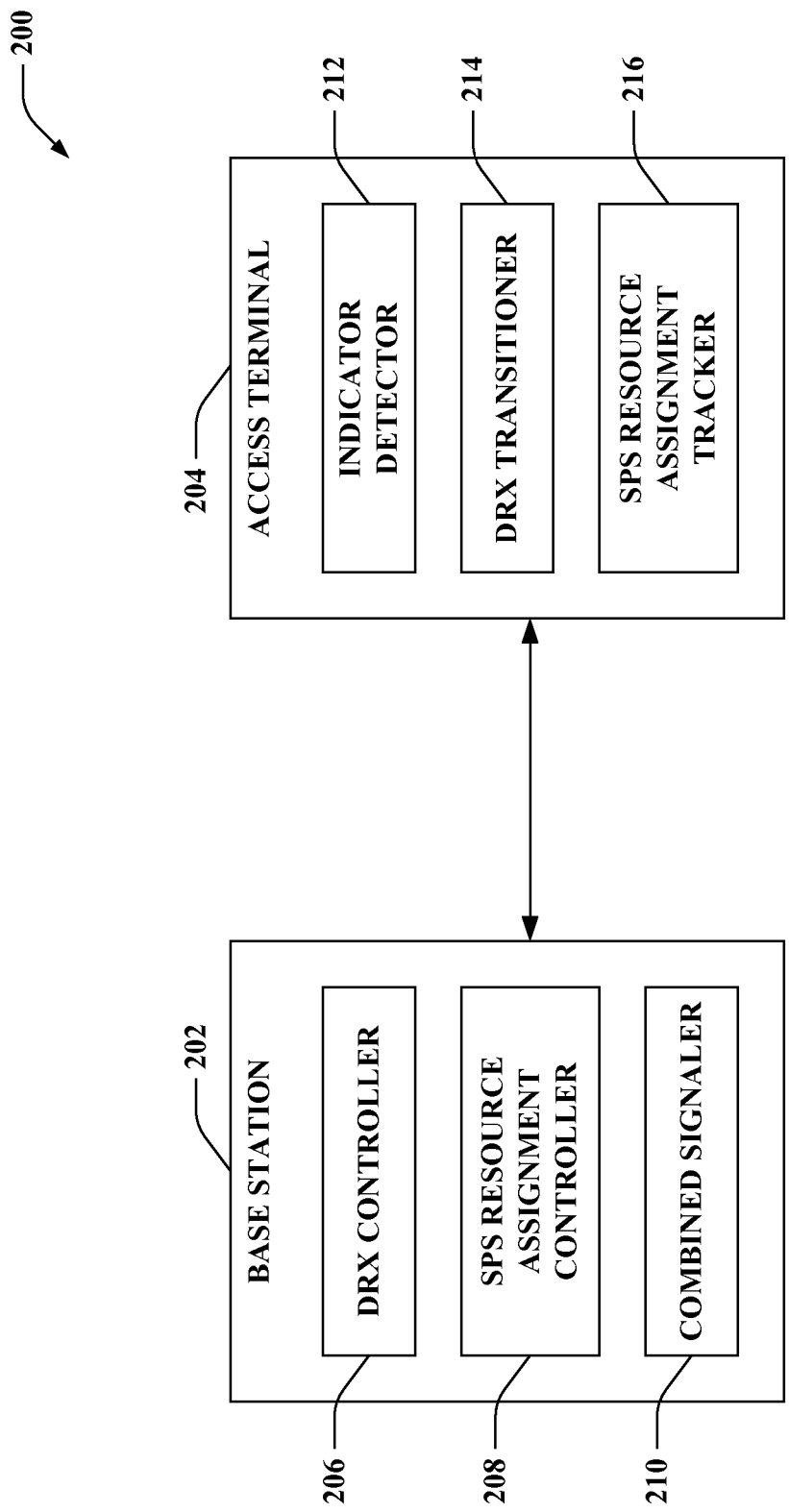
FIG. 2 is an illustration of an example system that coordinates transition to DRX mode and release of SPS resources in a wireless communication environment.

Referring to FIG. 2, illustrated is a system 200 that coordinates transition to DRX mode and release of SPS resources in a wireless communication environment. System 200 includes a base station 202 that can transmit and/or receive information, signals, data, instructions, commands, bits, symbols, and the like. Base station 202 can communicate with an access terminal 204 via the forward link and/or reverse link. Access terminal 204 can transmit and/or receive information, signals, data, instructions, commands, bits, symbols, and the like. Moreover, although not shown, it is contemplated that any number of base stations similar to base station 202 can be included in system 200 and/or any number of access terminals similar to access terminal 204 can be included in system 200.

Base station 202 can further include a DRX controller 206, an SPS resource assignment controller 208, and a combined signaler 210. DRX controller 206 can manage a mode (e.g., active mode, DRX mode, . . . ) employed by access terminal 204. More particularly, DRX controller 206 can monitor and/or control a current mode employed by access terminal 204. Further, DRX controller 206 can determine whether to cause access terminal 204 to transition between modes (e.g., switch from active mode to DRX mode, . . . ). For example, DRX controller 206 can evaluate an amount of data in a buffer intended for access terminal 204. DRX controller 206 can also analyze whether data will be transmitted or retransmitted to access terminal 204 prior to a beginning of a next DRX cycle. When DRX controller 206 recognizes that data likely will not be transmitted to access terminal 204 or received from access terminal 204 before the next DRX cycle, DRX controller 206 can initiate sending an indication (e.g., DRX indicator, . . . ) to access terminal 204 to cause access terminal 204 to transition to DRX mode. This indication, for instance, can stop a timer that maintains access terminal 204 in active mode, which can lead to access terminal 204 entering sleep mode (e.g., DRX mode, . . . ).

SPS resource assignment controller 208 can manage semi-persistent resource assignments for access terminal 204. For instance, SPS resource assignment controller 208 can semi-persistently assign resources (e.g., downlink, uplink, . . . ) to access terminal 204. SPS resources allocated by SPS resource assignment controller 208 can thereafter be utilized by access terminal 204 for transmitting data over PUSCH or receiving data over PDSCH, for example. Further, SPS resource assignment controller 208 can determine whether to release SPS resources previously allocated to access terminal 204. By way of example, when DRX controller 206 decides to notify access terminal 204 to switch to DRX mode, SPS resource assignment controller 208 can release one or more SPS resources allotted to access terminal 204. Following this example, SPS resource assignment controller 208 can also instigate indicating (e.g., via a resource release indicator, . . . ) such release of the one or more SPS resources to access terminal 204. Pursuant to another illustration, SPS resource assignment controller 208 can select to release uplink SPS resource(s) (e.g., semi-persistently scheduled PUSCH resource(s), . . . ) and/or downlink SPS resource(s) (e.g., semi-persistently scheduled PDSCH resource(s), . . . ) assigned to access terminal 204. It is contemplated that SPS resource assignment controller 208 can release all SPS resources allocated to access terminal 204, a subset of the SPS resources allocated to access terminal 204, or the like.

Combined signaler 210 can generate and/or transmit indicators for access terminal 204 via the downlink. For instance, when initiated by DRX controller 206, combined signaler 210 can yield and/or send a DRX indicator (e.g., DRX command, . . . ) that causes access terminal 204 to transition to DRX mode. The DRX indicator can notify access terminal 204 to operate its receiver in DRX mode. By way of another illustration, when instigated by SPS resource assignment controller 208, combined signaler 210 can yield and/or transfer a resource release indicator that notifies access terminal 204 that one or more SPS resources have been released by base station 202 (e.g., by SPS resource assignment controller 208, . . . ). According to an example, the resource release indicator can identify whether or not SPS resource(s) are released. By way of a further example, the resource release indicator can specify SPS resources that are (or are not) released by SPS resource assignment controller 208. Alternatively, the resource release indicator can signify that a predetermined subset or all SPS resources allocated to access terminal 204 are (or are not) released. Combined signaler 210 can transfer the DRX indicator and the resource release indicator in a single transaction.

Access terminal 204 can further include an indicator detector 212, a DRX transitioner 214, and an SPS resource assignment tracker 216. Indicator detector 212 can receive indicators sent by base station 202 (e.g., combined signaler 210, . . . ) via the downlink. For instance, within a common transaction, indicator detector 212 can obtain a DRX indicator that provides notification to switch to operating in DRX mode and a resource release indicator that provides notification as to one or more SPS resources, which were previously assigned to access terminal 204, that have been released by base station 202.

DRX transitioner 214 can cause access terminal 204 to enter DRX mode (e.g., sleep mode, . . . ) based upon the DRX indicator received by indicator detector 212. For example, if a timer is maintaining access terminal 204 in active mode, DRX transitioner 214 can halt the timer and effectuate switching to DRX mode operation.

Moreover, SPS resource assignment tracker 216 can monitor and/or identify resources (e.g., uplink resources, downlink resources, . . . ) that are semi-persistently assigned by base station 202 to access terminal 204. By way of example, SPS resource assignment tracker 216 can recognize when resources are added or removed from being semi-persistently assigned to access terminal 204 based upon received indications. An obtained resource release indicator can notify SPS resource assignment tracker 216 that one or more SPS resources have been released from being allocated to access terminal 204, and SPS resource assignment tracker 216 can remove these one or more SPS resources from a set of SPS resources assigned to access terminal 204. Thus, SPS resource assignment tracker 216 can recognize that access terminal 204 is to forgo transmitting data using uplink resource(s) or receiving data using downlink resource(s) that have been removed from the set of assigned SPS resources (e.g., until subsequent assignment, . . . ).

According to an example, base station 202 (e.g., combined signaler 210, . . . ) can transmit a single control message to communicate both the DRX indicator and the resource release indicator to access terminal 204 (e.g., indicator detector 212, . . . ). Hence, a single control message transferred by base station 202 over the downlink can include both the DRX indicator and the resource release indicator. For instance, a Media Access Control (MAC) Control Protocol Data Unit (PDU) that carries information related to release of SPS resource(s) and a command to cause access terminal 204 to sleep can be sent by base station 202.

By way of a further example, base station 202 (e.g., combined signaler 210, . . . ) can send the DRX indicator and the resource release indicator to access terminal 204 within one transaction. For instance, a transaction can occur within a transmission time interval (TTI). Messages can be transmitted over different channels within the same TTI as part of the single transaction such that access terminal 204 can enter sleep mode and discontinue SPS during substantially simultaneous time periods. Pursuant to this example, a downlink control channel (e.g., Physical Downlink Control Channel (PDCCH), . . . ) can carry information related to SPS resource release (e.g., the resource release indicator can be transmitted via PDCCH, . . . ). Further, a downlink data channel (e.g., Physical Downlink Shared Channel (PDSCH), . . . ) can carry the DRX indicator. For instance, a MAC Control PDU can be sent to access terminal 204 via PDSCH to cause access terminal 204 to transition to DRX mode.

In contrast to the aforementioned examples, conventional techniques commonly forgo indicating release of semi-persistent scheduling resource(s) to an access terminal. Thus, these conventional techniques can be inefficient (e.g., power efficiency can be lacking, . . . ).

Figure 3:
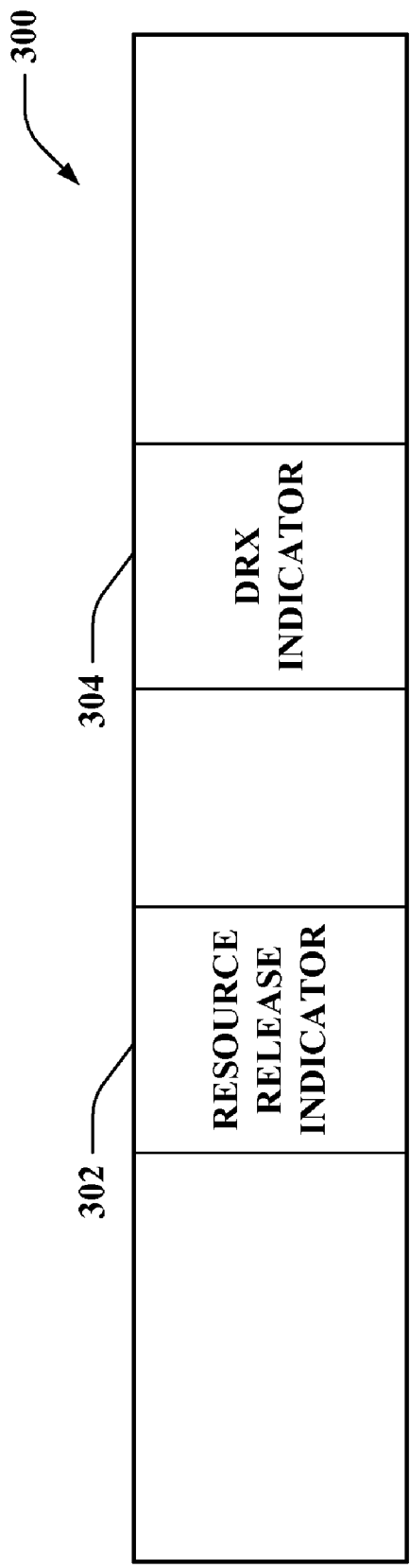
FIG. 3 is an illustration of an example control message that includes a resource release indicator and a DRX indicator.

Now turning to FIG. 3, illustrated is an example control message 300 that includes a resource release indicator 302 and a DRX indicator 304. It is to be appreciated that the claimed subject matter is not limited to the example control message 300. Further, it is contemplated that fields for resource release indicator 302 and DRX indicator 304 can each be positioned at substantially any location within control message 300. For instance, fields for resource release indicator 302 and DRX indicator 304 can be next to each other, separated from each other, at the beginning of control message 300, at the end of control message 300, in the middle of control message 300, and so forth. Moreover, resource release indicator 302 and DRX indicator 304 can have any relative position with respect to one another.

As depicted in this example, a single control message 300 includes both resource release indicator 302 and DRX indicator 304. Thus, a base station can transmit control message 300 to communicate both indicators 302-304 to an access terminal. The access terminal can receive control message 300 that is sent by the base station. In response to the received control message, a receiver of the access terminal can be operated in DRX mode based upon DRX indicator 304. Moreover, the access terminal can also be made aware of the release of one or more resources (e.g., release of one or more semi-persistent scheduling (SPS) resources, . . . ) based upon resource release indicator 302.

According to an illustration, control message 300 can be a MAC Control element (e.g., MAC Control PDU, . . . ), a MAC DRX Control element (e.g., MAC DRX Control PDU, . . . ), and so forth. Further, resource release indicator 302 can be, for example, a predetermined field in control message 300 (e.g., one or more bits in control message 300 that can but need not be contiguous, . . . ) that can indicate whether SPS resource(s) (e.g., downlink SPS resource(s), uplink SPS resource(s), . . . ) are released or not released. Pursuant to another example, resource release indicator 302 can be a single bit used to indicate whether SPS resource(s) are released or not released.

Accordingly, control message 300 can be used to efficiently notify an access terminal as to release of SPS resource(s). For instance, one or more bits of a single control message (e.g., control message 300, . . . ), which can be used to switch the access terminal to DRX mode, can also be reserved for indicating to the access terminal whether or not SPS resource(s) have been released. Moreover, it is noted that fields used for resource release indicator 302 and/or DRX indicator 304 can each be one or more bits in length. Further, when multiple bits are used for either of these fields, the bits can but need not be adjacent.

Figure 4:
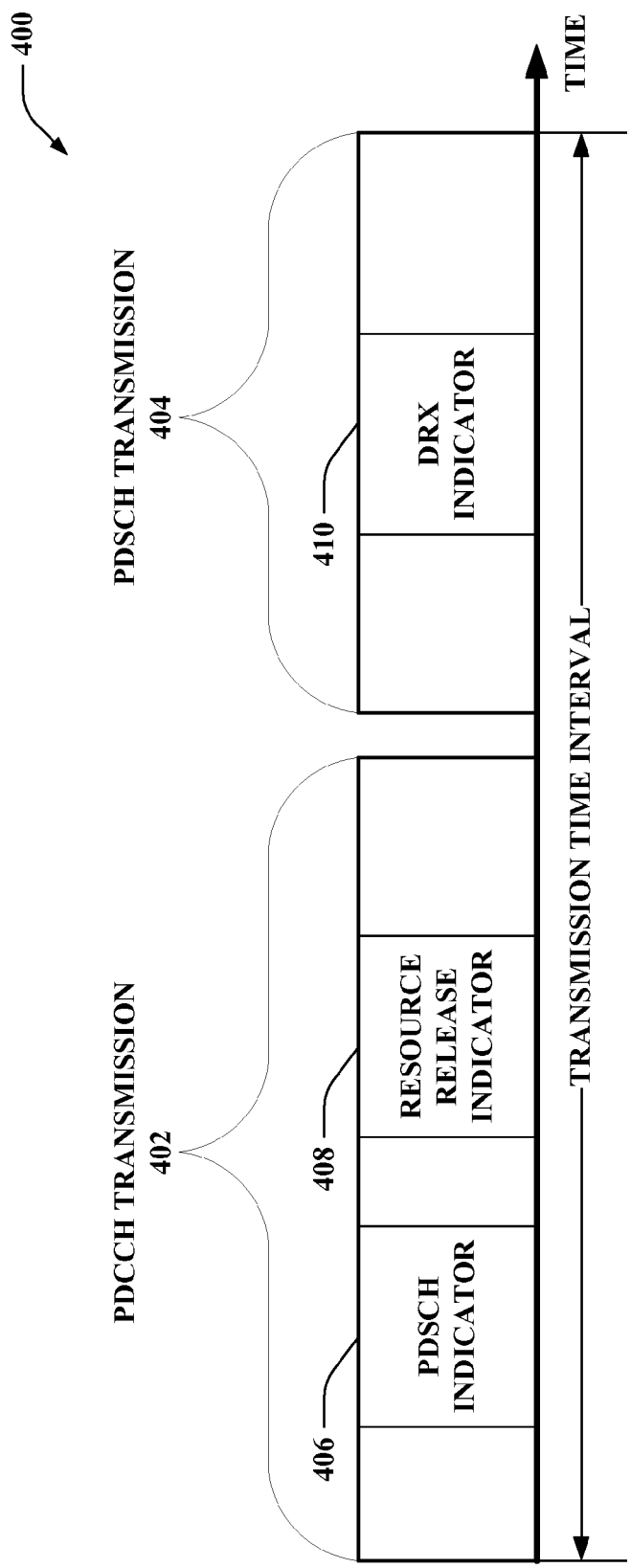
FIG. 4 is an illustration of an example transaction used to communicate a DRX command and indicate release of semi persistent resource(s) to an access terminal.

With reference to FIG. 4, illustrated is an example transaction 400 used to communicate a DRX command and indicate release of semi persistent resource(s) to an access terminal. Transaction 400 can occur within a single transmission time interval (TTI) (e.g., a TTI can be 1 ms, . . . ). A PDCCH transmission 402 can be sent during a first portion of the TTI (e.g., first portion of transaction 400, . . . ), and a PDSCH transmission 404 can be sent during a second portion of the TTI (e.g., second portion of transaction 400, . . . ). The first portion of the TTI occurs earlier in time as compared to the second portion of the TTI.

PDCCH transmission 402 can include a PDSCH indicator 406 that notifies a recipient access terminal as to presence of a corresponding PDSCH transmission 404 (e.g., within the second portion of the TTI/transaction 400, . . . ). PDCCH transmission 402 can further include a resource release indicator 408, which indicates release of one or more SPS resources (e.g., uplink SPS resources, downlink SPS resources, . . . ). For instance, resource release indicator 408 can specify whether or not SPS resource(s) have been released. Further, resource release indicator 408 can be one bit, a plurality of bits (e.g., adjacent to each other, separated from each other, . . . ).

Moreover, by leveraging PDSCH indicator 406, PDCCH transmission 402 can identify PDSCH transmission 404 as being part of transaction 400. Further, PDSCH transmission 404 can include a DRX indicator 410 that controls transitioning a receiving access terminal to DRX mode. For example, PDSCH transmission 404 can be a MAC Control element (e.g., MAC Control PDU, . . . ), a MAC DRX Control element (e.g., MAC DRX Control PDU, . . . ), and so forth.

Transaction 400 leverages use of PDCCH transmission 402 for signifying release of one or more SPS resources and presence of PDSCH transmission 404. Moreover, PDSCH transmission 404 can carry information to indicate to a receiving access terminal to operate in DRX mode. Thus, within transaction 400, a base station can cause an access terminal to transition to DRX mode and specify that one or more SPS resources have been released.

By utilizing mechanisms and techniques described herein, a base station can indicate release of SPS resource(s) to an access terminal in an efficient manner when sending a power saving control message (e.g., within the same transaction or TTI as shown in FIG. 4, within the same control message as shown in FIG. 3, . . . ). Moreover, these mechanisms and techniques described herein can enable the base station to communicate or signal release of SPS resource(s) to the access terminal when the base station lacks data in a buffer and likely will not perform new transmissions or retransmissions before a beginning of a next DRX cycle.

Figure 5:
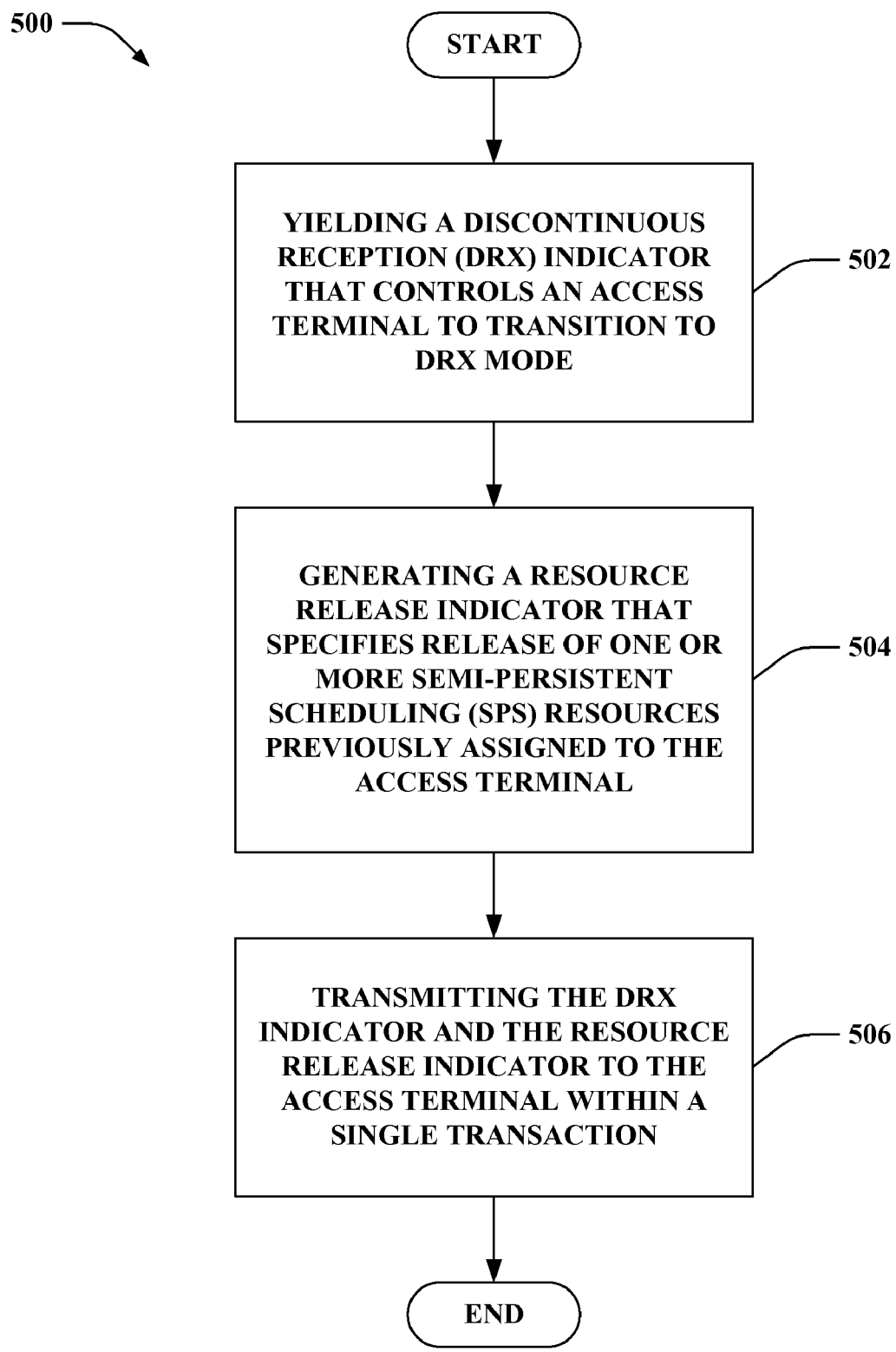
FIG. 5 is an illustration of an example methodology that facilitates coordinating notifications provided to an access terminal in a wireless communication environment.
Figure 6:
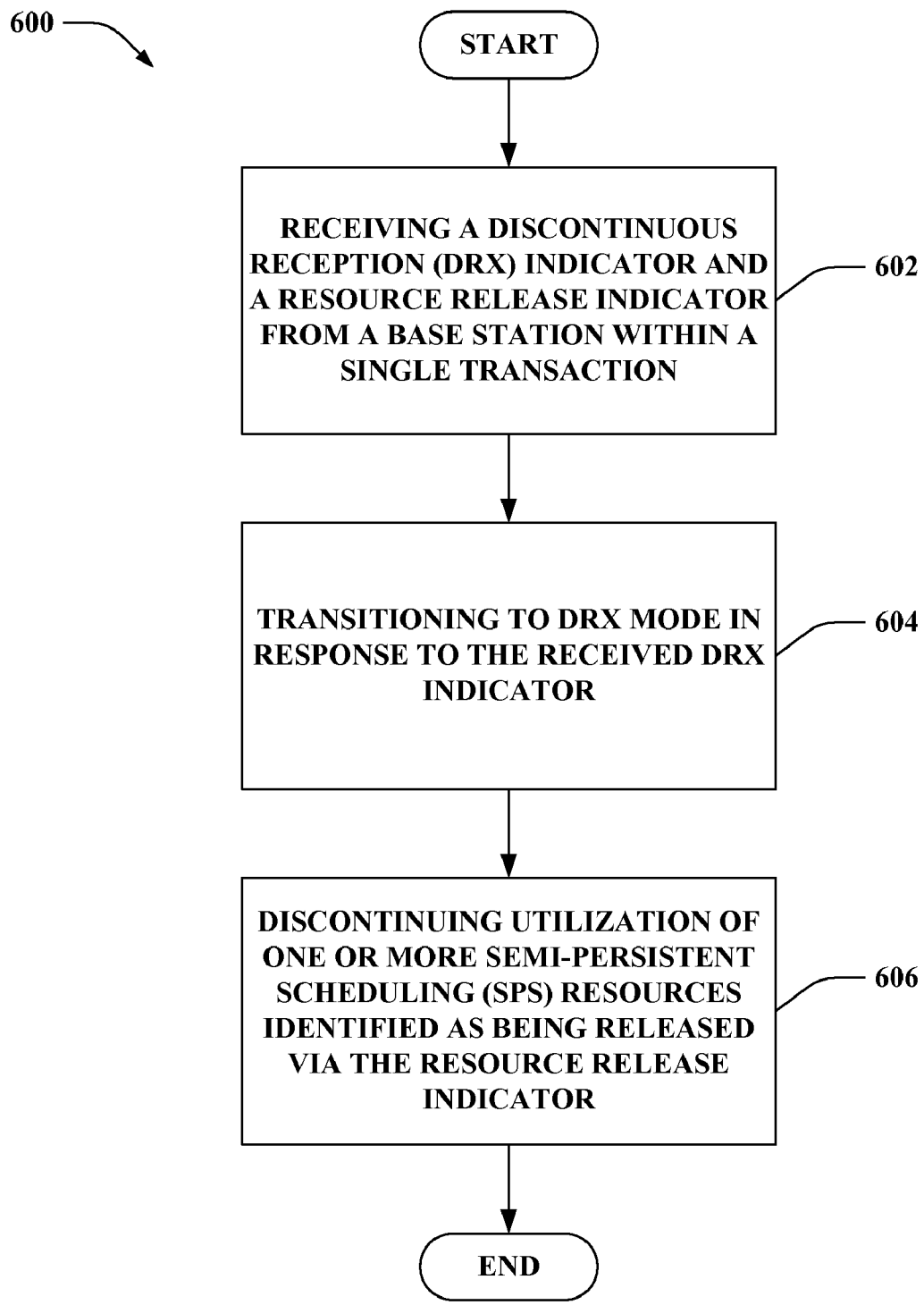
FIG. 6 is an illustration of an example methodology that facilitates employing indications obtained from a base station in a wireless communication environment.

Referring to FIGS. 5-6, methodologies relating to coordinating DRX control and SPS resource release in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 5, illustrated is a methodology 500 that facilitates coordinating notifications provided to an access terminal in a wireless communication environment. At 502, a discontinuous reception (DRX) indicator that controls an access terminal to transition to DRX mode can be yielded. For instance, the DRX indicator can be yielded in response to determining that a buffer lacks data intended for the access terminal, and transmission or retransmission to the access terminal will likely not be performed prior to a beginning of a next DRX cycle. At 504, a resource release indicator that specifies release of one or more semi-persistent scheduling (SPS) resources previously assigned to the access terminal can be generated. The resource release indicator can indicate that the one or more SPS resources are released, for example. According to another illustration, the resource release indicator can signify that the one or more SPS resources are not released. Pursuant to a further example, the resource release indicator can be one bit (e.g., one codepoint, . . . ) that indicates whether or not the one or more SPS resources are released. Moreover, the one or more SPS resources can be one or more uplink SPS resources (e.g., one or more Physical Uplink Shared Channel (PUSCH) SPS resources, . . . ) and/or one or more downlink SPS resources (e.g., one or more Physical Downlink Shared Channel (PDSCH) SPS resources, . . . ).

At 506, the DRX indicator and the resource release indicator can be transmitted to the access terminal within a single transaction. By way of example, the single transaction can occur within one transmission time interval (TTI) (e.g., 1 ms, . . . ). Following this example, a control channel transmission (e.g., Physical Downlink Control Channel (PDCCH) transmission, . . . ) can be sent during a first portion of the TTI and can carry the resource release indicator and a data channel indicator that identifies presence of a corresponding data channel transmission. Moreover, the corresponding data channel transmission (e.g., Physical Downlink Shared Channel (PDSCH) transmission, . . . ) identified by the data channel indicator can be sent during a second portion of the TTI and can carry the DRX indicator. The data channel transmission, for instance, can be a Media Access Control (MAC) Control element (e.g., MAC Control PDU, . . . ), a MAC DRX Control element (e.g., MAC DRX Control PDU, . . . ), and so forth. According to another example, the DRX indicator and the resource release indicator can be transmitted to the access terminal within a single control message. Following this example, the DRX indicator and the resource release indicator can be transported by a Media Access Control (MAC) Control element (e.g., MAC Control PDU, . . . ), a MAC DRX Control element (e.g., MAC DRX Control PDU, . . . ), or the like.

Turning now to FIG. 6, illustrated is a methodology 600 that facilitates employing indications obtained from a base station in a wireless communication environment. At 602, a discontinuous reception (DRX) indicator and a resource release indicator can be received from a base station within a single transaction. For instance, the single transaction can occur within one transmission time interval (TTI) (e.g., 1 ms, . . . ). Accordingly, a control channel transmission (e.g., Physical Downlink Control Channel (PDSCH) transmission, . . . ) can be received during a first portion of the TTI, and the resource release indicator can be identified from the control channel transmission. Further, presence of a corresponding data channel transmission can be recognized based upon an indicator included in the control channel transmission. Moreover, the corresponding data channel transmission (e.g., Physical Downlink Shared Channel (PDSCH) transmission, . . . ) can be received during a second portion of the TTI, and the DRX indicator can be identified from the data channel transmission. The data channel transmission, for instance, can be a Media Access Control (MAC) Control element (e.g., MAC Control PDU, . . . ), a MAC DRX Control element (e.g., MAC DRX Control PDU, . . . ), and so forth. According to another example, the DRX indicator and the resource release indicator can be received from the base station within a single control message. Following this example, the DRX indicator and the resource release indicator can be obtained via a Media Access Control (MAC) Control element (e.g., MAC Control PDU, . . . ), a MAC DRX Control element (e.g., MAC DRX Control PDU, . . . ), or the like.

At 604, transition to DRX mode can be effectuated in response to the received DRX indicator. For instance, a timer (e.g., an inactivity timer, a retransmission timer, an on-duration timer, a combination thereof, . . . ) that maintains an access terminal in active mode can be stopped based upon the received DRX indicator, thereby causing the access terminal to switch to DRX mode. At 606, utilization of one or more semi-persistent scheduling (SPS) resources identified as being released via the resource release indicator can be discontinued. The resource release indicator can indicate that the one or more SPS resources are released, for example. According to another illustration, the resource release indicator can signify that the one or more SPS resources are not released. Pursuant to a further example, the resource release indicator can be one bit that indicates whether or not the one or more SPS resources are released. Moreover, the one or more SPS resources can be one or more uplink SPS resources (e.g., one or more Physical Uplink Shared Channel (PUSCH) SPS resources, . . . ) and/or one or more downlink SPS resources (e.g., one or more Physical Downlink Shared Channel (PDSCH) SPS resources, . . . ).

It will be appreciated that, in accordance with one or more aspects described herein, inferences can be made regarding coordinating indications concerning DRX control and SPS resource release in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to determining whether to transition an access terminal to DRX mode and/or release SPS resource(s). By way of further illustration, an inference can be made related to determining which SPS resource(s) that were previously assigned to an access terminal to release. It will be appreciated that the foregoing examples are illustrative in nature and are not intended to limit the number of inferences that can be made or the manner in which such inferences are made in conjunction with the various embodiments and/or methods described herein.

Figure 7:
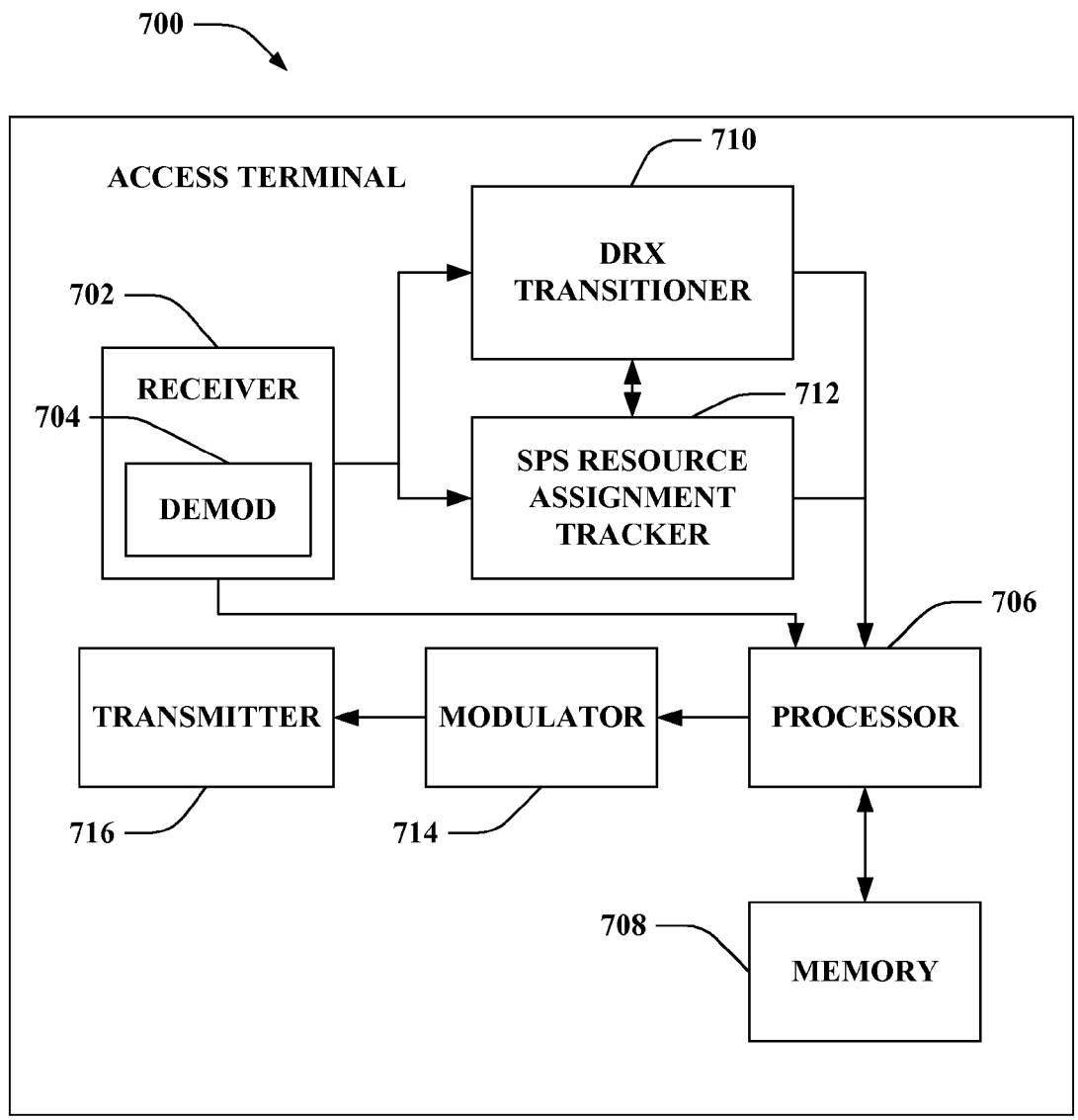
FIG. 7 is an illustration of an example access terminal that obtains a DRX indicator and a resource release indicator within a common transaction in a wireless communication system.

FIG. 7 is an illustration of an access terminal 700 that obtains a DRX indicator and a resource release indicator within a common transaction in a wireless communication system. Access terminal 700 comprises a receiver 702 that receives a signal from, for instance, a receive antenna (not shown), and performs typical actions thereon (e.g., filters, amplifies, downconverts, etc.) the received signal and digitizes the conditioned signal to obtain samples. Receiver 702 can be, for example, an MMSE receiver, and can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of access terminal 700, and/or a processor that both analyzes information received by receiver 702, generates information for transmission by transmitter 716, and controls one or more components of access terminal 700.

Access terminal 700 can additionally comprise memory 708 that is operatively coupled to processor 706 and that can store data to be transmitted, received data, and any other suitable information related to performing the various actions and functions set forth herein. Memory 708, for instance, can store protocols and/or algorithms associated with receiving, analyzing and/or utilizing indicators (e.g., DRX indicators, resource release indicators, . . . ).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Although not shown, receiver 702 can include an indicator detector, which can be substantially similar to indicator detector 212 of FIG. 2. Alternatively, receiver 702 can be operatively coupled to an indicator detector. Receiver 702 is further operatively coupled to a DRX transitioner 710 and/or an SPS resource assignment tracker 712. DRX transitioner 710 can be substantially similar to DRX transitioner 214 of FIG. 2 and/or SPS resource assignment tracker 712 can be substantially similar to SPS resource assignment tracker 216 of FIG. 2. Receiver 702 (or an indicator detector) can obtain a DRX indicator and a resource release indicator within a common transaction. Further, DRX transitioner 710 can transition access terminal 700 to operate in DRX mode (e.g., sleep mode, . . . ) based upon the obtained DRX indicator. For instance, while in DRX mode, receiver 702 can be switched off for a period of time. Moreover, SPS resource assignment tracker 712 can discontinue use of one or more SPS resources (e.g., uplink resource(s), downlink resource(s), . . . ) recognized as being released. For instance, SPS resource assignment tracker 712 can recognize that the one or more SPS resources are released based upon the obtained resource release indicator. Access terminal 700 still further comprises a modulator 714 and a transmitter 716 that transmits data, signals, etc. to a base station (e.g., a serving base station, . . . ). Although depicted as being separate from the processor 706, it is to be appreciated that DRX transitioner 710, SPS resource assignment tracker 712 and/or modulator 714 can be part of processor 706 or a number of processors (not shown).

Figure 8:
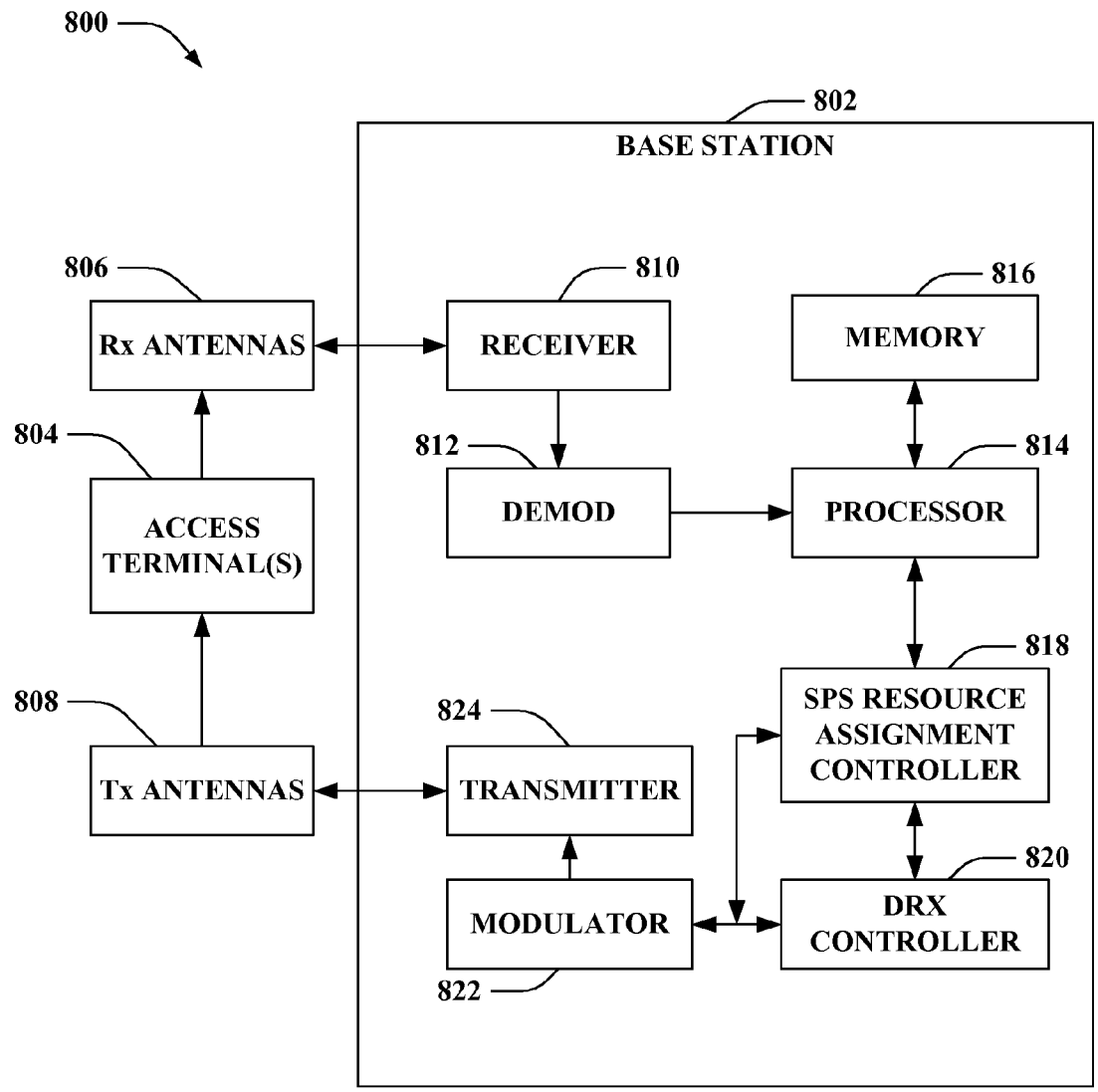
FIG. 8 is an illustration of an example system that sends a DRX indicator and a resource release indicator within a common transaction in a wireless communication environment.

FIG. 8 is an illustration of a system 800 that sends a DRX indicator and a resource release indicator within a common transaction in a wireless communication environment. System 800 comprises a base station 802 (e.g., access point, . . . ) with a receiver 810 that receives signal(s) from one or more access terminals 804 through a plurality of receive antennas 806, and a transmitter 824 that transmits to the one or more access terminals 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores data to be transmitted to or received from access terminal(s) 804 and/or any other suitable information related to performing the various actions and functions set forth herein. Processor 814 is further coupled to an SPS resource assignment controller 818 that yields resource release indicators to notify access terminal(s) 804 as to release of one or more SPS resources. Moreover, base station 802 can include a DRX controller 820 that can yield DRX indicators to control access terminal(s) 804 to transition to operating in DRX mode. It is contemplated that SPS resource assignment controller 818 can be substantially similar to SPS resource assignment controller 208 of FIG. 2 and/or DRX controller 206 can be substantially similar to DRX controller 206 of FIG. 2. Further, although not shown, it is to be appreciated that base station 802 can further include a combined signaler (e.g., which can be substantially similar to combined signaler 210 of FIG. 2, . . . ). By way of further illustration, SPS resource assignment controller 818 and DRX controller 820 (or a combined signaler, . . . ) can provide indicators to be transmitted to a modulator 822. Modulator 822 can multiplex a frame for transmission by a transmitter 824 through antennas 808 to access terminal(s) 804 in accordance with the aforementioned description. Although depicted as being separate from the processor 814, it is to be appreciated that SPS resource assignment controller 818, DRX controller 820, and/or modulator 822 can be part of processor 814 or a number of processors (not shown).

Figure 9:
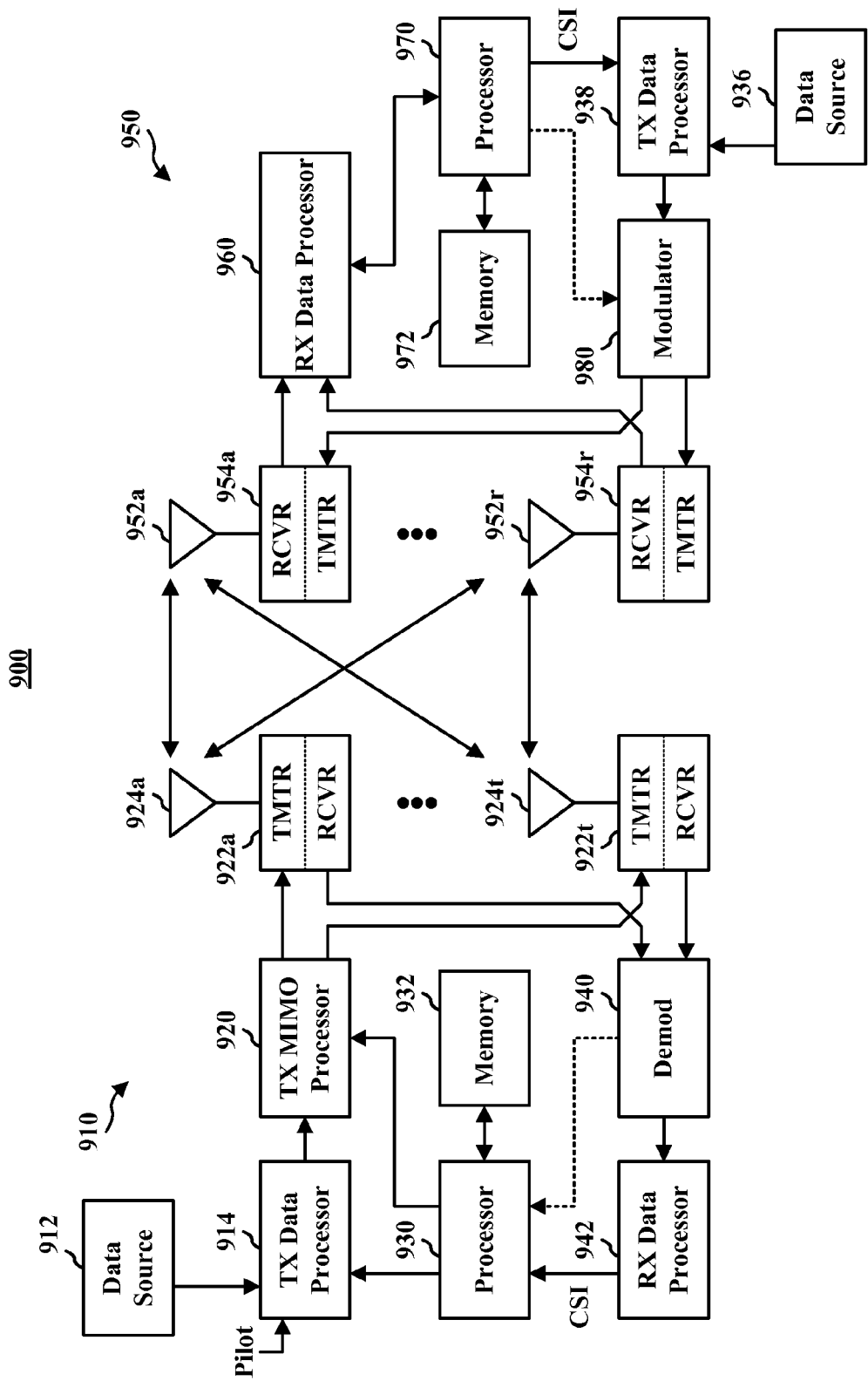
FIG. 9 is an illustration of an example wireless network environment that can be employed in conjunction with the various systems and methods described herein.

FIG. 9 shows an example wireless communication system 900. The wireless communication system 900 depicts one base station 910 and one access terminal 950 for sake of brevity. However, it is to be appreciated that system 900 can include more than one base station and/or more than one access terminal, wherein additional base stations and/or access terminals can be substantially similar or different from example base station 910 and access terminal 950 described below. In addition, it is to be appreciated that base station 910 and/or access terminal 950 can employ the systems (FIGS. 1-2, 7-8, and 10-11) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At access terminal 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which available technology to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from access terminal 950 are received by antennas 924, conditioned by receivers 922, demodulated by a demodulator 940, and processed by a RX data processor 942 to extract the reverse link message transmitted by access terminal 950. Further, processor 930 can process the extracted message to determine which precoding matrix to use for determining the beamforming weights.

Processors 930 and 970 can direct (e.g., control, coordinate, manage, etc.) operation at base station 910 and access terminal 950, respectively. Respective processors 930 and 970 can be associated with memory 932 and 972 that store program codes and data. Processors 930 and 970 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, ... ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents.

Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
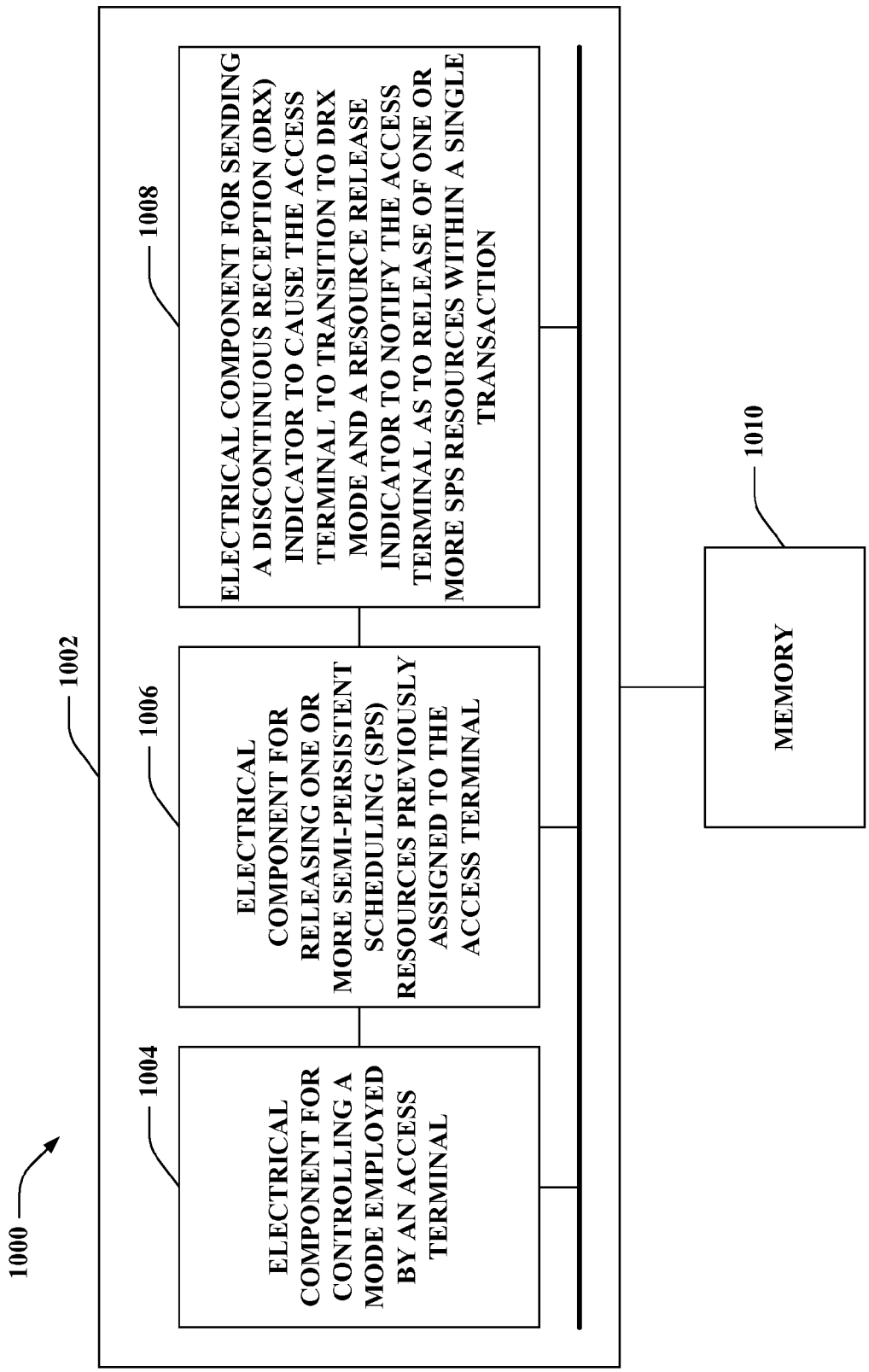
FIG. 10 is an illustration of an example system that enables providing notifications to an access terminal concerning DRX control and SPS resource release in a wireless communication environment.

With reference to FIG. 10, illustrated is a system 1000 that enables providing notifications to an access terminal concerning DRX control and SPS resource release in a wireless communication environment. For example, system 1000 can reside at least partially within a base station. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for controlling a mode employed by an access terminal 1004. Moreover, logical grouping 1002 can include an electrical component for releasing one or more semi-persistent scheduling (SPS) resources previously assigned to the access terminal 1006. Further, logical grouping 1002 can include an electrical component for sending a discontinuous reception (DRX) indicator to cause the access terminal to transition to DRX mode and a resource release indicator to notify the access terminal as to release of one or more SPS resources within a single transaction 1008. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Figure 11:
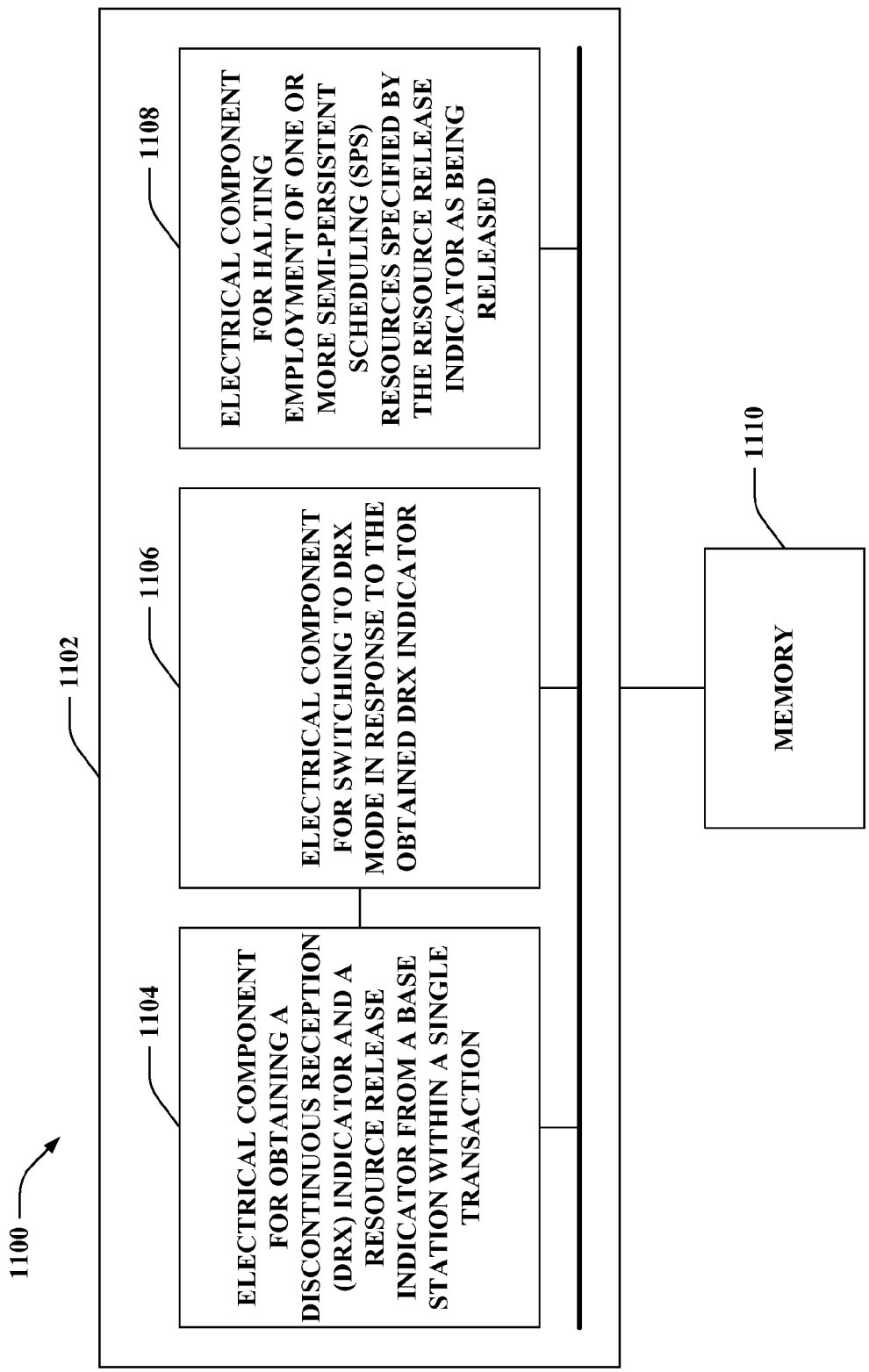
FIG. 11 is an illustration of an example system that enables employing indicators obtained from a base station in a wireless communication environment.

With reference to FIG. 11, illustrated is a system 1100 that enables employing indicators obtained from a base station in a wireless communication environment. For example, system 1100 can reside within an access terminal. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for obtaining a discontinuous reception (DRX) indicator and a resource release indicator from a base station within a single transaction 1104. Further, logical grouping 1102 can include an electrical component for switching to DRX mode in response to the obtained DRX indicator 1106. Moreover, logical grouping 1102 can include an electrical component for halting employment of one or more semi-persistent scheduling (SPS) resources specified by the resource release indicator as being released 1108. Additionally, system 1100 can include a memory 1110 that retains instructions for executing functions associated with electrical components 1104, 1106, and 1108. While shown as being external to memory 1110, it is to be understood that one or more of electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates coordinating notifications provided to an access terminal in a wireless communication environment, comprising:
   generating a discontinuous reception (DRX) indicator that indicates to the access terminal to transition to DRX mode;
   generating a resource release indicator that specifies release of one or more semi-persistent scheduling (SPS) resources previously assigned to the access terminal;
   transmitting, by a base station, the DRX indicator and the resource release indicator to the access terminal within a single transaction, the single transaction occurring within a single transmission time interval (TTI), the transmitting comprising,
   sending a control channel transmission in a first portion of the single TTI, the control channel transmission carrying the resource release indicator and a data channel indicator that identifies the presence of a corresponding data channel transmission; and
   sending the corresponding data channel transmission identified by the data channel indicator during a second portion of the single TTI, the corresponding data channel transmission carrying the DRX indicator.

2. The method of claim 1, wherein the resource release indicator signifies that the one or more SPS resources are not released.

3. The method of claim 1, wherein the resource release indicator indicates whether the one or more SPS resources are released.

4. The method of claim 1, wherein the one or more SPS resources include at least one uplink SPS resource.

5. The method of claim 1, wherein the one or more SPS resources include at least one downlink SPS resource.

6. The method of claim 1, wherein the control channel transmission is a Physical Downlink Control Channel (PDCCH) transmission and the data channel transmission is a Physical Downlink Shared Channel (PDSCH) transmission.

7. The method of claim 1, wherein the data channel transmission is at least one of a Media Access Control (MAC) Control element or a MAC DRX Control element.

8. The method of claim 1, wherein the control channel transmission is at least one of a Media Access Control (MAC) Control element or a MAC DRX Control element.

9. A wireless communications apparatus, comprising:
   a memory that retains instructions related to
   generating a discontinuous reception (DRX) indicator that indicates, to an access terminal, to transition to DRX mode,
   generating a resource release indicator that specifies release of one or more semi-persistent scheduling (SPS) resources previously assigned to the access terminal, and
   transmitting the DRX indicator and the resource release indicator to the access terminal within a single transaction, the single transaction occurring within a single transmission time interval (TTI), the transmitting comprising sending a Physical Downlink Control Channel (PDCCH) transmission in a first portion of the single TTI, the PDCCH transmission carrying the resource release indicator and a Physical Downlink Shared Channel (PDSCH) indicator that specifies the presence of a corresponding PDSCH transmission, and sending the corresponding PDSCH transmission specified by the PDSCH indicator during a second portion of the single TTI, the corresponding PDSCH transmission carrying the DRX indicator; and a processor, coupled to the memory, configured to execute the instructions retained in the memory.

10. The wireless communications apparatus of claim 9, wherein the one or more SPS resources include at least one uplink SPS resource.

11. The wireless communications apparatus of claim 9, wherein the one or more SPS resources include at least one downlink SPS resource.

12. A wireless communications apparatus that enables providing notifications to an access terminal concerning DRX control and SPS resource release in a wireless communication environment, comprising:

means for controlling a mode employed by the access terminal;

means for releasing one or more semi-persistent scheduling (SPS) resources previously assigned to the access terminal; and means for transmitting a discontinuous reception (DRX) indicator to cause the access terminal to transition to DRX mode and a resource release indicator to notify the access terminal as to release of one or more SPS resources within a single transaction, the single transaction occurring within a single transmission time interval (TTI), wherein the means for transmitting, sends a Physical Downlink Control Channel (PDCCH) transmission in a first portion of the single TTI, the PDCCH transmission carrying the resource release indicator and a Physical Downlink Shared Channel (PDSCH) indicator that specifies the presence of a corresponding PDSCH transmission, and sends the corresponding PDSCH transmission specified by the PDSCH indicator during a second portion of the single TTI, the corresponding PDSCH transmission carrying the DRX indicator.

13. The wireless communications apparatus of claim 12, wherein the one or more SPS resources include at least one uplink SPS resource.

14. The wireless communications apparatus of claim 12, wherein the one or more SPS resources include at least one downlink SPS resource.

15. A computer program product, comprising:

a non-transitory computer-readable medium comprising:

code, stored on the medium, for controlling a mode employed by the access terminal;

code, stored on the medium, for releasing one or more semi-persistent scheduling (SPS) resources previously assigned to the access terminal; and code, stored on the medium, for transmitting a discontinuous reception (DRX) indicator to cause the access terminal to transition to DRX mode and a resource release indicator to notify the access terminal as to release of one or more SPS resources within a single transaction, the single transaction occurring within a single transmission time interval (TTI), the code for transmitting comprising, code for sending a Physical Downlink Control Channel (PDCCH) transmission in a first portion of the single TTI, the PDCCH transmission carrying the resource release indicator and a Physical Downlink Shared Channel (PDSCH) indicator that specifies the presence of a corresponding PDSCH transmission, and code for sending the corresponding PDSCH transmission specified by the PDSCH indicator during a second portion of the single TTI, the corresponding PDSCH transmission carrying the DRX indicator.

16. The computer program product of claim 15, wherein the one or more SPS resources include at least one uplink SPS resource.

17. The computer program product of claim 15, wherein the one or more SPS resources include at least one downlink SPS resource.

18. In a wireless communications system, an apparatus comprising:

a processor configured to:

generate a discontinuous reception (DRX) indicator that indicates to the access terminal to transition to DRX mode;

generate a resource release indicator that specifies release of one or more semi-persistent scheduling (SPS) resources previously assigned to the access terminal; and transfer the DRX indicator and the resource release indicator to the access terminal within a single transmission time interval (TTI), the transfer comprising, sending a Physical Downlink Control Channel (PDCCH) transmission in a first portion of the single TTI, the PDCCH transmission carrying the resource release indicator and a Physical Downlink Shared Channel (PDSCH) indicator that specifies the presence of a corresponding PDSCH transmission, and sending the corresponding PDSCH transmission specified by the PDSCH indicator during a second portion of the single TTI, the corresponding PDSCH transmission carrying the DRX indicator.

19. A method that facilitates employing indications obtained from a base station in a wireless communication environment, comprising:

receiving, by an access terminal, a discontinuous reception (DRX) indicator and a resource release indicator from a base station within a single transaction, the single transaction occurring within a single transmission time interval (TTI), the receiving comprising, receiving a control channel transmission during a first portion of the single TTI, identifying the resource release indicator from the control channel transmission, recognizing the presence of a corresponding data channel transmission based upon a disparate indicator included in the control channel transmission, receiving the corresponding data channel transmission during a second portion of the single TTI, and identifying the DRX indicator from the data channel transmission;

transitioning to DRX mode in response to the received DRX indicator; and discontinuing utilization of one or more semi-persistent scheduling (SPS) resources identified as being released via the resource release indicator.

20. The method of claim 19, wherein the resource release indicator is one bit that indicates whether or not the one or more SPS resources are released.

21. The method of claim 19, wherein the one or more SPS resources include at least one uplink SPS resource.

22. The method of claim 19, wherein the one or more SPS resources include at least one downlink SPS resource.

23. The method of claim 19, wherein the control channel transmission is a Physical Downlink Control Channel (PDCCH) transmission and the data channel transmission is a Physical Downlink Shared Channel (PDSCH) transmission.

24. A wireless communications apparatus, comprising:
a memory that retains instructions related to
receiving a discontinuous reception (DRX) indicator and a resource release indicator from a base station within a single transaction, receiving comprising,
receiving a Physical Downlink Control Channel (PDCCH) transmission during a first portion of a transmission time interval (TTI),
identifying the resource release indicator from the PDCCH transmission,
recognizing the presence of a corresponding Physical Downlink Shared Channel (PDSCH) transmission based upon a disparate indicator included in the PDCCH transmission,
receiving the corresponding PDSCH transmission during a second portion of the TTI, and
identifying the DRX indicator from the PDSCH transmission,
transitioning to DRX mode in response to the received DRX indicator, and
discontinuing utilization of one or more semi-persistent scheduling (SPS) resources identified as being released via the resource release indicator; and
a processor, coupled to the memory, configured to execute the instructions retained in the memory.

25. The wireless communications apparatus of claim 24, wherein the one or more SPS resources include at least one uplink SPS resource.

26. The wireless communications apparatus of claim 24, wherein the one or more SPS resources include at least one downlink SPS resource.

27. A wireless communications apparatus that enables employing indicators obtained from a base station in a wireless communication environment, comprising:
means for obtaining a discontinuous reception (DRX) indicator and a resource release indicator from a base station within a single transaction, the means for obtaining
receives a Physical Downlink Control Channel (PDCCH) transmission during a first portion of a transmission time interval (TTI),
identifies the resource release indicator from the PDCCH transmission,
recognizes the presence of a corresponding Physical Downlink Shared Channel (PDSCH) transmission based upon a disparate indicator included in the PDCCH transmission,
receives the corresponding PDSCH transmission during a second portion of the TTI, and
identifies the DRX indicator from the PDSCH transmission;
means for switching to DRX mode in response to the obtained DRX indicator; and
means for halting employment of one or more semi-persistent scheduling (SPS) resources specified by the resource release indicator as being released.

28. A computer program product, comprising:
a non-transitory computer-readable medium comprising:
code, stored on the medium, for obtaining a discontinuous reception (DRX) indicator and a resource release indicator from a base station within a single transaction, the code for obtaining comprising,
code for receiving a Physical Downlink Control Channel (PDCCH) transmission during a first portion of a transmission time interval (TTI),
code for identifying the resource release indicator from the PDCCH transmission,
code for recognizing the presence of a corresponding Physical Downlink Shared Channel (PDSCH) transmission based upon a disparate indicator included in the PDCCH transmission,
code for receiving the corresponding PDSCH transmission during a second portion of the TTI, and
code for identifying the DRX indicator from the PDSCH transmission;
code, stored on the medium, for switching to DRX mode in response to the obtained DRX indicator; and
code, stored on the medium, for halting employment of one or more semi-persistent scheduling (SPS) resources specified by the resource release indicator as being released.

29. In a wireless communications system, an apparatus comprising:
a processor configured to:
receive a discontinuous reception (DRX) indicator and a resource release indicator from a base station within a single transmission time interval (TTI) the receiving comprising,
receiving a Physical Downlink Control Channel (PDCCH) transmission during a first portion of a transmission time interval (TTI),
identifying the resource release indicator from the PDCCH transmission,
recognizing the presence of a corresponding Physical Downlink Shared Channel (PDSCH) transmission based upon a disparate indicator included in the PDCCH transmission,
receiving the corresponding PDSCH transmission during a second portion of the TTI, and
identifying the DRX indicator from the PDSCH transmission;
transition to DRX mode in response to the received DRX indicator; and
discontinue utilization of one or more semi-persistent scheduling (SPS) resources identified as being released via the resource release indicator.

* * * * *